(12) United States Patent
Gruber (10) Patent No.: US 7,602,399 B2
(45) Date of Patent: Oct. 13, 2009

(54) METHOD AND APPARATUS FOR GENERATING A PIXEL USING A CONDITIONAL IF_NEIGHBOR COMMAND

(75) Inventor: Andrew E. Gruber, Arlington, MA (US)

(73) Assignee: ATI Technologies ULC, Markham, Ontario (CA)

( * ) Notice: Subject to any disclaimer, the term of this patent is extended or adjusted under 35 U.S.C. 154(b) by 554 days.

(21) Appl. No.: 11/375,750

(22) Filed: Mar. 15, 2006

(65) Prior Publication Data
US 2007/0216693 A1    Sep. 20, 2007

(51) Int. Cl.
*G06T 15/00* (2006.01)
(52) U.S. Cl. .................. 345/587; 345/582; 710/316; 712/245
(58) Field of Classification Search ............. 345/587, 345/582, 583, 584, 585, 586; 710/316; 711/217; 712/9, 245
See application file for complete search history.

(56) References Cited

U.S. PATENT DOCUMENTS

| 5,598,571 | A | * | 1/1997 | Gallup et al. | ............ 712/9 |
| 5,664,134 | A | * | 9/1997 | Gallup et al. | ............ 712/245 |
| 5,742,786 | A | * | 4/1998 | Gallup et al. | ............ 711/217 |
| 6,085,275 | A | * | 7/2000 | Gallup et al. | ............ 710/316 |

* cited by examiner

*Primary Examiner*—Phu K Nguyen
(74) *Attorney, Agent, or Firm*—Vedder Price P.C.

(57) ABSTRACT

A device and method for controlling generation of a final pixel utilizes a conditional statement, referred to as an IF_NEIGHBOR statement, which when compiled, causes a programmable pixel shader to perform mip map texture lookups even if a pixel of interest does not meet the condition of the conditional statement. As such, any neighboring pixels needed for mip map selection have their associated shader code guaranteed to execute even though the pixel of interest may fail the conditional portion of the conditional statement. The device and method executes texture address calculations for pixels within a region and for pixels outside of a region but only those necessary to determine the mip map level corresponding to a pixel within the region. Execution of shader code for a current pixel is executed if any of the surrounding neighboring pixels meet the desired condition even if the current pixel does not meet the condition.

12 Claims, 4 Drawing Sheets

METHOD AND APPARATUS FOR GENERATING A PIXEL USING A CONDITIONAL IF_NEIGHBOR COMMAND

BACKGROUND OF THE INVENTION

The invention relates generally to graphics processing apparatus and methods and more particularly to graphics processing apparatus and methods that employ programmable shaders to produce pixels for display on a display.

Graphics processing circuits, such as graphics processors that are integrated on an integrated circuit, or are part of a larger system incorporated on an integrated circuit or multiple integrated circuits, are known to employ programmable shader hardware to produce pixels by among other things, retrieving texture information from a texture memory or texture cache and applying the texture to a pixel(s) that make up a portion of an object to give the object a particular three dimensional or two dimensional look. The object may be displayed on a display device such as a display screen or piece of paper printed by a printer, or any other output. For example, devices, such as cell phones, laptop computers, desktop computers, cable interface devices, printers, or any other suitable devices may employ graphics processing circuitry in the form of a graphics processing unit (GPU) or other structure and may also include a processor, such as a host processor, which executes a 3D application such as a 3D game or any other suitable application. A driver application also executing on the host processor includes a portion thereof that acts as a compiler that compiles instructions from the application into a format suitable for a programmable hardware pixel shader in the graphics processing circuitry to generate appropriate pixel information for display. In addition, shader code is a block of shader instructions for a given pixel. Shader code is known to include for some types of operations, conditional statements which is a block of instructions which, for example, may include an IF_THEN statement. For example, the IF portion of the IF_THEN statement defines a condition that must be met in order for the body of the THEN portion of the conditional statement to be carried out. As known in the art, mip map lookups typically require a determination of which mip map level (texture granularity level) to use to determine which texture address to retrieve for a given pixel. Typically, in order for a proper mip map selection to be made, the pixel shader needs valid neighboring pixel information since a mip map level is determined based on a plurality of pixels and not just one pixel. If a conditional statement (e.g. the body) requires a texture fetch, and a neighboring pixel does not meet the condition, an improper mip map level could result.

Stated another way, to compute a final color of a pixel, the pixel shader needs to evaluate neighboring pixels to determine an appropriate mip map level to do proper texture fetching. For example, conditional statements such as IF_THEN statements have a block of instructions therein that may require a texture fetch for the pixel. However, if the texture fetch has to be done, the proper mip map level must be known and the mip map level is based on the texture coordinate values of neighboring pixels. Known techniques require the shader code for each pixel to execute every time in order for a texture fetch to occur and the graphics processing system is not optimized.

Figure 1:
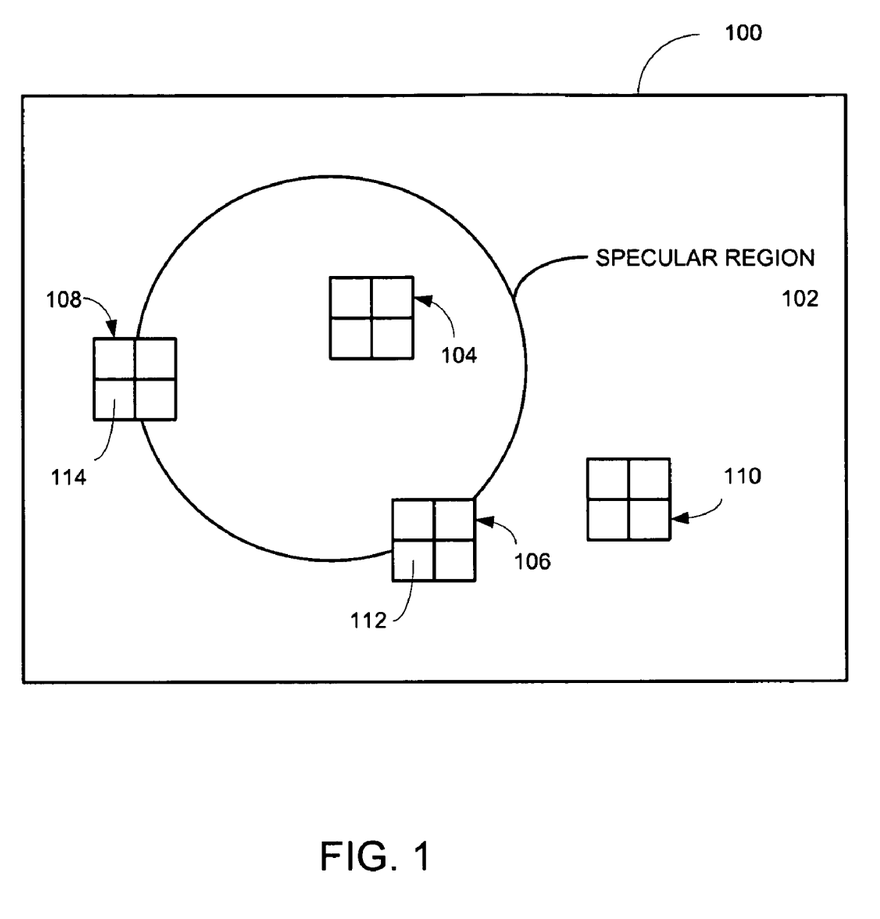
FIG. 1 is a diagram illustrating one example of a portion of a screen display that includes a specular region.

For example, referring to FIG. 1, an object 100, such as a rectangle formed by four vertices, will be assumed to be a portion of a ball that will be displayed on a display device. In this example, a light source in the frame to be displayed creates a specular region 102 on the ball and is located in this example in the object 100. A specular region as known in the art may be, for example, the white portion of the object that is displayed to show that the portion of the ball is shiny and it is the reflection of the light source. Various 2×2 pixel regions ("quads") are also shown as regions 104, 106, 108 and 1110. As shown, each 2×2 pixel region may require a texture to be applied to each of the pixels in the 2×2 pixel region. In this example, the 2×2 pixel region 104 has all of its four pixels in the specular region 102 of the object 100. Similarly, the 2×2 pixel region 110 has all of its pixels in a non-specular region of the object 100. In contrast, each of 2×2 pixel regions 106 and 108 include one or more pixels that are in the specular region 102 and one or more pixels that are outside of the specular region 102 (in a non-specular region).

It would be desirable to be able to conditionally execute shader code for only a subset of pixels, based on dynamic considerations such as executing shader code on only the subset of pixels that require the calculation of a specular term, such as the pixels in the 2×2 pixel region 104, that would reflect specularly towards the eye point. However, a problem is that if the condition, such as the pixels must specularly reflect, mip mapped texture lookups are required and mip map selection hardware requires valid neighboring pixel information, even for those pixels that would fail the condition test, such as pixels 112 and 114 that are outside of the specular region 102 and do not specularly reflect. However, the 2×2 pixel regions 108 and 106 include pixels that would require calculation of a specular term since some of these pixels do lie in the specular region 102.

One solution has been to calculate the mip map selection information unconditionally, and then only allow conditional texture fetches of the type that use this previously (unconditionally) calculated mip map selection information. Such solutions only execute the shader code for those pixels that do not rely on neighboring information on a conditional basis. However, in many cases, a large part of the calculation must be done for all pixels, rather than for only a small percentage of pixels, resulting in reduced system performance. Current systems may require the calculation of the texture address all of the time for all pixels and then perform texture fetches only if the pixels are within the area of concern. These additional calculations can result in unnecessary use of scarce resources, particularly when a complex 3D imaging application or applications are required to execute on a device.

Another solution is for a compiler to recognize the undesirability of the conditional texture fetch and move the texture fetch inside the conditional statement on its own and allocate registers so as to assure that the program visible state is not overwritten. The compiler in addition utilizes programmable shader hardware mechanisms that execute whenever a pixel of a 2×2 quad is active. However, the compiler may not perform an optimal job of rearranging texture fetches and may not result in optimum code for the shader.

Accordingly, a need exists to overcome one or more of the above problems.

BRIEF DESCRIPTION OF THE DRAWINGS

The invention will be more readily understood in view of the following description when accompanied by the below figures and wherein like reference numerals represent like elements.

DETAILED DESCRIPTION OF THE PRESENT EMBODIMENTS

Briefly, a device and method for controlling generation of a final pixel utilizes a conditional statement, referred to as an IF_NEIGHBOR statement, which when compiled, causes a programmable pixel shader to execute a mip map texture lookup even if a pixel of interest does not meet the condition of the conditional statement for that pixel. Any neighboring pixels needed for mip map selection have their associated shader code guaranteed to execute even though the pixel of interest may fail the conditional portion of the conditional statement. Accordingly, in response to an application level IF_NEIGHBOR statement, the device and method executes texture address calculations for pixels within a region and for pixels outside of a region but only those necessary to determine the mip map level corresponding to a pixel within the region. Execution of shader code for a current pixel is performed if any of the surrounding neighboring pixels meet the desired condition, even if the current pixel does not meet the condition.

The device includes logic, such as a pixel shader, that in response to the compiled IF_NEIGHBOR statement, is operative to determine whether a current pixel meets a first condition of a conditional statement in a block of shader instructions that include at least one mip map texture fetch instruction. If the current pixel meets the first condition, a body of the conditional statement for the current pixel is executed. Therefore, the body of the conditional statement that includes the mip map texture fetch instruction is executed. If the current pixel does not meet the first condition of the conditional statement, the logic determines whether the first condition is met for any of a plurality of neighboring pixels. Neighboring pixels may be any suitable surrounding pixels whether adjacent to a current pixel or further away. If any of the plurality of neighboring pixels meet the conditional statement, the body of conditional statement for the current pixel that includes the mip map texture fetch instruction is executed. Also, each of the plurality of neighboring pixels that meet the first condition of the conditional statement have their shader code carried out also.

Thus, even if the current pixel does not meet the condition, if any neighboring pixels meet the condition, the body of the conditional statement is executed for the current pixel. As such, a new conditional statement (e.g. IF_NEIGHBOR) is employed that allows consideration of neighboring pixels when performing mip map texture fetch instructions. For all pixels that meet the IF portion of the condition, their shader code is executed and all pixels that have a neighbor that meets the IF portion of the condition have their shader code executed even though the current pixel may not meet the current condition.

Figure 2:
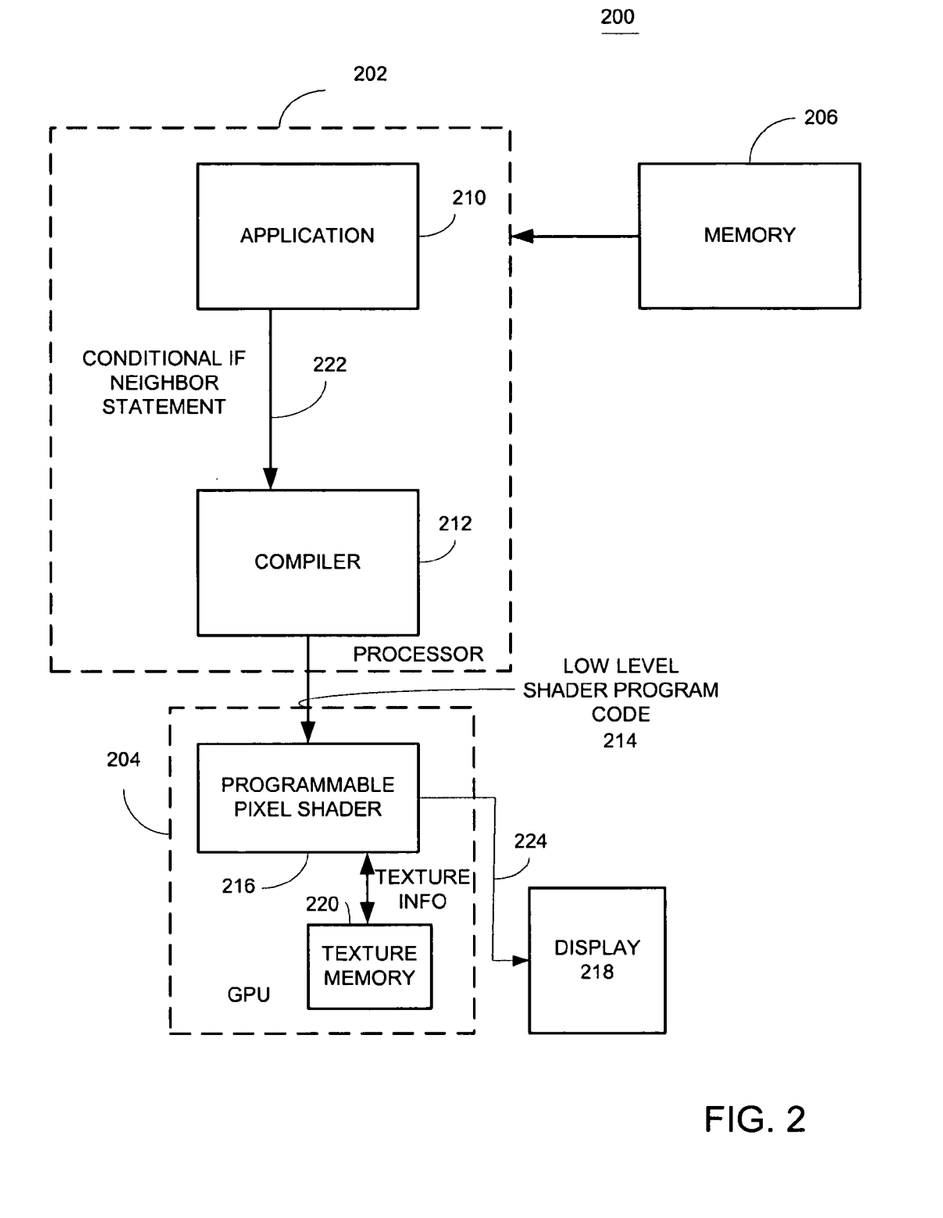
FIG. 2 is a block diagram illustrating one example of a device for controlling generation of a final pixel in accordance with one embodiment of the invention.

FIG. 2 illustrates one example of a device 200, such as a handheld device, laptop computer, printer or any other suitable device that, in this example, employs a processor 202 and graphics processing circuitry 204 that are in communication through one or more suitable buses. In this example, the processor 202 may be a host processor and the graphics processing circuitry 204 may be a graphics processing unit integrated in a separate chip. However, the processor 202 and graphics processing circuitry 204 may be suitably integrated on a common die or on separate die but in a same package if desired or may be in any suitable configuration. The device 200 also includes memory 206 such as a hard drive, system memory or any other suitable memory that stores 3D applications and graphics drivers. The memory may be RAM, ROM or any suitable memory that stores digital information. In this example, the applications and graphics drivers are shown to be executing on the processor 202. For example, the processor 202 may be executing an application 210 such as a 3D game or any other suitable application and the processor 202 may also be executing a 3D graphics driver that includes a compiler 212 that compiles instructions provided by the application 210 into lower level shader program code shown as 214. The graphics processing circuitry 204 includes a programmable pixel shader 216 that obtains the low level shader program code 214 and executes the low level shader program code to produce pixels that are displayed on a suitable display 218 which may be local or remote display such as an LCD or any other suitable display. The graphics processing circuitry 204 is also shown to include texture memory 220 which the programmable pixel shader 216 accesses as known in the art. The display 218 in one example, outputs the final pixel 224 produced by the graphics circuitry 204, for display. However as noted above, it will be recognized that the final pixel may be an intermediate pixel value that requires further processing if desired.

The memory stores an application and hence application level executable instructions containing at least one IF_NEIGHBOR conditional statement that when compiled produces shader code that causes a shader to determine whether a current pixel meets a first condition of the IF_NEIGHBOR conditional statement or one of pixels neighboring the current pixel meets the first condition of the IF_NEIGHBOR conditional statement whose body includes mip mapped texture fetch instructions; and if so, execute the compiled body of the IF_NEIGHBOR conditional statement for the current pixel including a mip map texture fetch instruction, as further set forth below.

The compiler 212 (e.g. software executing on the processor) serves as logic that is operative to receive the application level IF_NEIGHBOR statement and generate a block of shader instructions that cause the pixel shader to carry out the operations described herein. The application 210 provides commands to the compiler 212. In this embodiment, the application 210 provides, among other statements, a conditional IF_NEIGHBOR statement 222 which when compiled, causes the programmable pixel shader 216 to produce a final pixel. As used herein, final pixel does not refer solely to the pixel that is actually displayed on the display 218, but may be an intermediate pixel value that may undergo further processing if desired. Data representing the conditional IF_NEIGHBOR statement is part of a block of shader instructions also referred to herein as shader code corresponding to a pixel. In this example, the conditional IF_NEIGHBOR statement will be described as an IF_THEN statement having unique properties and include as part of a body of the statement, one or more mip map texture fetch instructions.

Figure 3:
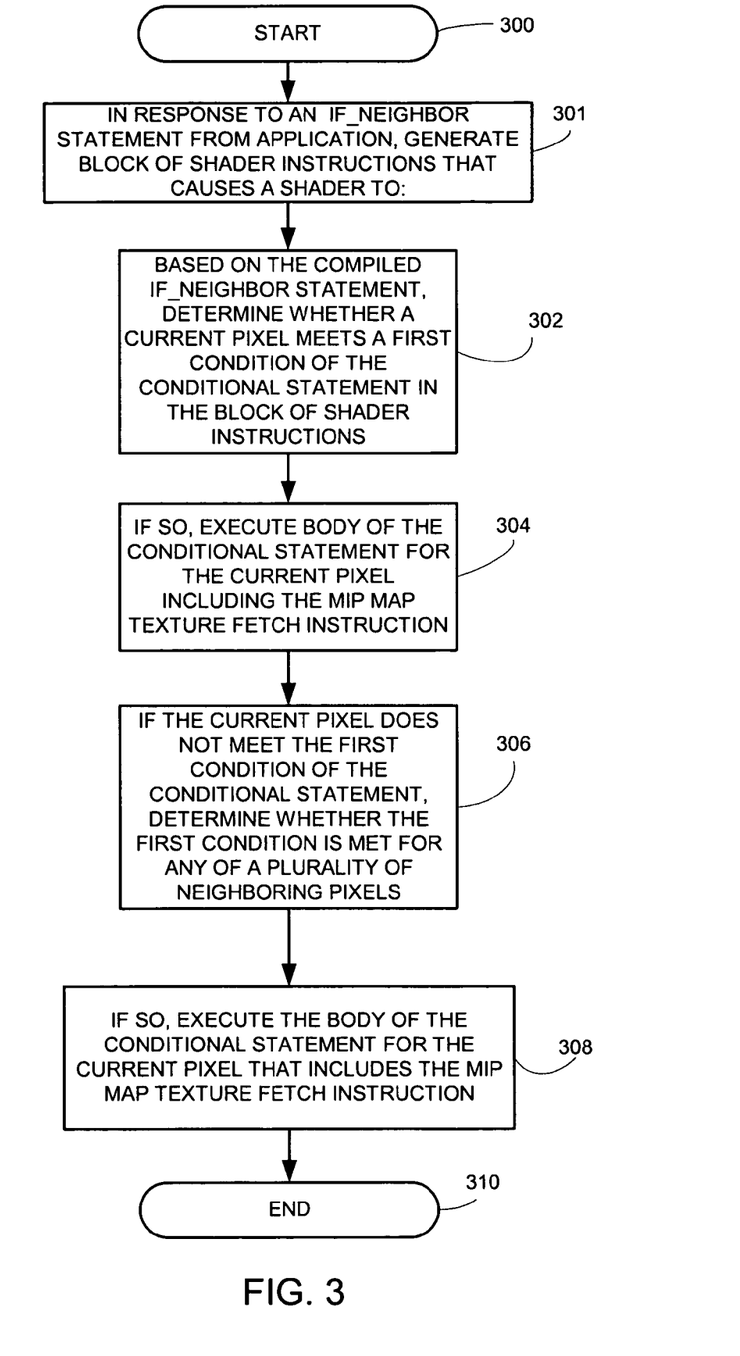
FIG. 3 is a flowchart illustrating one example of a method for controlling generation of a final pixel in accordance with one embodiment of the invention.

Referring also to FIG. 3, one example of a method for controlling generation of a final pixel is illustrated. This method may be carried out by the compiler and shader. However, it will be recognized that any suitable logic may be utilized and that the logic may be in any suitable device, system or subsystem. The shader may be structured so that neighboring pixel may be whatever surrounding pixels are needed to calculate the correct texture map. In general this will be pixels in the same 2×2 quad aligned region but need not be.

It will be recognized that although the described operation will be made with reference to the compiler 212 and the programmable pixel shader 216, it will be recognized that any suitable hardware, software or any suitable combination thereof may be used, including but not limited to, state machines, DSPs, programmable microcomputers, discrete logic, or any suitable combination of hardware, software or firmware. As shown in block 300, the process starts by, for example, the compiler 212 receiving the conditional IF_NEIGHBOR statement from the application 210. This may be part of shader code for a given pixel and hence, part of a block of shader instructions and in particular, the conditional IF_NEIGHBOR statement may be a conditional statement in a block of shader instructions and includes a mip map texture fetch instruction. As shown on block 301, the compiler generates compiled shader code based on the IF_NEIGHBOR statement. As shown in block 302, the method includes determining, such as by the shader, whether a current pixel associated with the shader code meets the condition of the IF_NEIGHBOR statement 222 that is in the block of shader instructions. For example, one example of an IF_NEIGHBOR statement may be if "a pixel will specularly reflect" then "calculate the specular term including mip mapped texture lookups". As shown in block 304, if the shader determines that the condition is met by the current pixel, the compiler will control flow of execution of the body of the conditional statement, and hence the "then" portion of the IF_NEIGHBOR statement for the current pixel. The body of the conditional statement includes a mip map texture fetch instruction.

As shown in block 306, if the current pixel does not meet the first condition of the conditional statement, and in this example if the pixel will not specularly reflect, the shader determines whether the first condition is met for any of a plurality of neighboring pixels, as shown in block 306. If any of the neighboring pixels meet the first condition of the conditional statement, the body of the conditional statement of the current pixel is executed by the shader. This is shown in block 308. As noted above, the conditional statement includes the mip map texture fetch instruction. Accordingly, the shader code is executed for all pixels that meet the IF_NEIGHBOR condition and shader code is executed for all pixels that have a neighbor that meets the condition even if the pixel itself does not. As such, the shader code for neighboring pixels as well as a current pixel that meets the condition are carried out. In addition, even if a current pixel does not meet the condition, then any neighboring pixels that do are also executed (their shader code is executed). As shown in block 310, the method may then be repeated for any other pixels whose shader code includes mip map texture fetch instructions.

The device 200 includes the graphics processing circuitry, that in this example includes a programmable pixel shader of the type found in an RADEON™ X1800 graphics processor, sold by ATI Technologies Inc., 1 Commerce Valley Drive, Thornhill, Ontario, Canada, that executes the instructions provided by the compiler. However, any suitable structure may be used. In one example, the graphics processing circuitry 204 generates the final pixel for display on display 218 generally shown as 224. The final pixel is determined based on the executed shader instructions of each of the plurality of neighboring pixels if neighboring pixels are evaluated. The proper mip map level is determined since the texture fetch calculations are completed for neighboring pixels such as a quad of pixels even though one (or more) of the pixels in the quad do not meet the condition requirement. For example, referring back to FIG. 1, even though a pixel 114 may not meet the requirement that the pixel will specularly reflect, its texture address is nonetheless calculated since it is in a quad with other pixels that meet the condition. The processor and graphics processing circuitry need not calculate all values of all pixels as in prior systems but only those that are needed.

Figure 4:
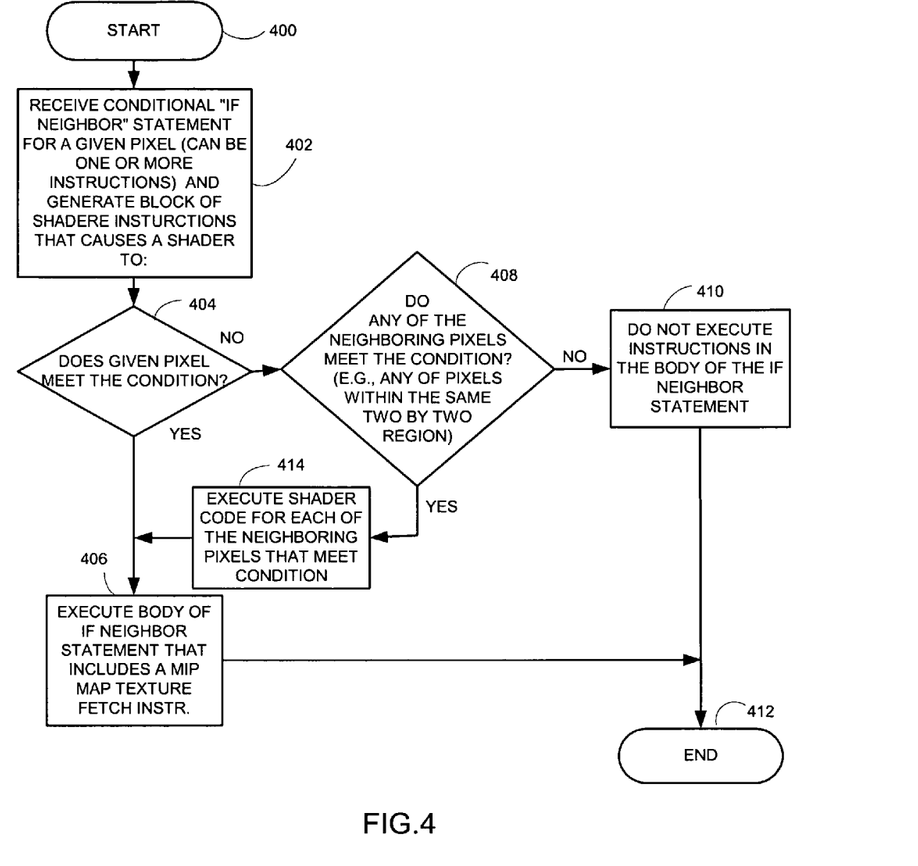
FIG. 4 is a flowchart illustrating one example of a method for controlling generation of a final pixel in accordance with one embodiment of the invention.

FIG. 4 illustrates one example of a method for generating a final pixel, such as after a texture has been applied, and is similar to the method shown in FIG. 3. The method below may be carried out by any suitable structure and, in this example, is carried out by the compiler 212 and programmable pixel shader 216. As shown in block 400, the method may start by application 210 executing on the processor and providing the conditional statement, such as the conditional IF_NEIGHBOR statement 222, to the compiler 212. As shown in block 402, the method includes receiving the conditional IF_NEIGHBOR statement for a given pixel and generating a block shader instructions based thereon that causes the shader to carry out the operations in steps 404-410. As noted above, the IF_NEIGHBOR statement may include one or more instructions. As shown in block 404, the method includes determining whether the given pixel meets the condition of the conditional IF_NEIGHBOR statement. The block of shader instructions that contains the conditional statement also includes a mip map texture fetch instruction. As shown in block 406, if the given pixel meets the condition, the method includes executing the compiled body of the IF_NEIGHBOR statement wherein the compiled body includes the mip map texture fetch instruction. The execution may be carried out, for example, by the programmable pixel shader 216.

If, however, the given pixel does not meet the condition, as shown in block 408, the method includes determining if any of the neighboring pixels of the current pixel meet the condition. For example, if a quad of pixels is being considered, neighboring pixels would include the other three pixels of the quad. However, it will be recognized that any suitable number of neighboring pixels may be evaluated. If none of the neighboring pixels meet the condition, then the method, as shown in block 410, includes not executing the instructions in the body of the IF_NEIGHBOR statement and the process may end as shown in block 412. However, if the given pixel does not meet the condition, but one or more of the neighboring pixels meets the condition of the condition statement, the method includes executing the shader code for each of the neighboring pixels that meet the condition as shown in block 414. The method then includes executing the body of the IF_NEIGHBOR statement that includes the mip map texture fetch instruction for the current pixel. The method may then continue the process for a next current pixel. The execution of the body of the IF_NEIGHBOR statement in addition to executing any of the other shader code for a given pixel results in, for example, a final pixel being rendered.

Also, as noted above, where the compiler and shader are carrying out a particular method such as that shown in FIG. 3, the method may include executing at least one texture fetch command in each of associated shader code for the plurality of neighboring pixels. The condition of the IF_NEIGHBOR condition statement may include the condition that a pixel location is in an area having a texture attribute, or any other suitable condition as desired. For example, where the condition tested for is based on taking the surface 'half angle' (a vector that represents the reflection of light off the surface of the object and doing a vector dot product with a vector representing the direction of the eye):

reflection=half_angle dot eye

'reflection' will be a measure how direct the reflection is. For example if 'reflection'=1 then the light reflects strongly towards the eye and a specular calculation should be done. If 'reflection'=0 then there is no reflection of light towards the eye. So typically the test will be to see whether cos(theta) is close to 1 where theta is the angle between the eye and the 'half angle' vector.

The methodology assures the pixels that should not normally execute (but do—because they are 'neighbors') still get the correct final value. Pseudo code for the desired operation would be as follows but may not actually work:

```
       pixel_value = material_color.
       specular_cosine = half_angle dot eye   /* as explained
below */
    if (specular_cosine > reflection_threshold)
       {        <calculate texture address for reflection>
                <perform MIP mapped texture fetch into an environment
                map to retrieve
the environment color>
                pixel value = material_color * environment_color
       }
```

So that pixels within the specularity get:
    material_color*environment_color

For their final value, while pixels outside of the specularity get:
    material_color as their final value.

The above pseudo code does not actually work because the texture fetch will fail to select the correct MIP Map.

The above code could be re-written using the IF_NEIGHBOR statement as:

```
       pixel_value = material_color.
       specular_cosine = half_angle dot eye /* as explained
below */
       IF_NEIGHBOR (specular_cosine > reflection_threshold)
       {        <calculate texture address for reflection>
                <perform MIP Mapped texture fetch into an environment
                map to retrieve
the environment color>
       }
    if (specular_cosine > reflection_threshold)
       {        pixel_value = material_color * environment_color
       }
```

Assuring that the texture fetch works correctly, yet only pixels within the specularity get a pixel value that includes the environment color.

Among other advantages, the new application level IF_NEIGHBOR conditional statement facilitates improved performance when a block of shader instructions involve mip mapped texture lookups and allows neighboring pixels to have their texture address calculations be performed even if the current pixel does not meet a condition of the conditional statement. As such, even if a pixel fails the condition test, the body of the condition statement may or may not be executed, but any neighboring pixels needed for a mip map selection are executed (their associated shader code is executed). Accordingly, pixels on a border of a texture transition, such as where a pixel is on the border of a specularity region versus a non-specularity region, need not use indeterminate mip map levels for their texture fetches. Instead, pixels that are along the border of a change in texture are nonetheless executed to provide the suitable texture fetch calculations for those pixels that are within a particular texture region. Other advantages will be recognized by those of ordinary skill in the art.

It is therefore contemplated that the present invention cover any and all modifications, variations or equivalents that fall within the spirit and scope of the basic underlying principles disclosed above and claimed herein.

What is claimed is:

1. A method, carried out by a computing device, for generating a final value for a pixel, the method comprising:
    in response to data representing an IF_NEIGHBOR conditional statement, comprised of an IF_THEN statement whose body includes mip mapped texture fetch instructions, generating a compiled block of shader instructions that cause a shader to:
        determine whether a current pixel meets a first condition of the IF_NEIGHBOR conditional statement or one of the pixels neighboring the current pixel meets the first condition of the IF_NEIGHBOR conditional statement whose body includes mip mapped texture fetch instructions wherein the neighboring pixel is one that is used to calculate a texture map; and
        if so, execute a compiled body of the IF_NEIGHBOR conditional statement for the current pixel including the mip map texture fetch instruction.

2. The method of claim 1, wherein executing the compiled body of the IF_NEIGHBOR statement comprises executing at least one mip map texture fetch instruction for each of the plurality of neighboring pixels.

3. The method of claim 2 comprising generating the final pixel based on a executed shader instructions of each of the plurality of neighboring pixels.

4. The method of claim 1 wherein the first condition includes a pixel location being in an area having a texture attribute.

5. The method of claim 4 wherein the texture attribute includes specularity.

6. The method of claim 1 comprising providing the IF_NEIGHBOR statement by an application executing on a processing device.

7. An apparatus for generating a final value for a pixel, whose shader program includes mip mapped textured fetches comprising:
    logic operative to, in response to data representing an IF_NEIGHBOR conditional statement, comprised of an IF_THEN statement whose body includes mip mapped texture fetch instructions, generate a compiled block of shader instructions for a current pixel for a shader;
    graphics processing circuitry comprising a shader operative to:
        determine whether the current pixel meets a first condition of the IF_NEIGHBOR conditional statement or one of a plurality of pixels neighboring the current pixel meets the first condition of the IF_NEIGHBOR conditional statement whose body includes mip mapped texture fetch instructions wherein the neighboring pixel is one that is used to calculate a texture map; and
        if so, execute a compiled body of the IF_NEIGHBOR conditional statement for the current pixel including the mip map texture fetch instruction, based on the compiled block of shader instructions.

8. The apparatus of claim 7 wherein the shader is operative to execute a block of shader instructions for each of the plurality of pixels neighboring the current pixel by executing at least one mip map texture fetch instruction for each of the plurality of pixels.

9. The apparatus of claim 8 wherein the shader is operative to generate the final pixel based on executed shader instructions of each of the plurality of neighboring pixels.

10. The apparatus of claim 8 comprising a display operatively coupled to the shader to display the final pixel produced by the shader.

11. The apparatus of claim 7 wherein the logic comprises a processor operating as a compiler.

12. Memory comprising an application level of executable instructions containing data representing at least one IF_NEIGHBOR conditional statement comprised of an IF_THEN statement whose body includes mip mapped texture fetch instructions that when compiled produces shader code that causes a shader to:
- determine whether a current pixel meets a first condition of the IF_NEIGHBOR conditional statement or one of pixels neighboring the current pixel meets the first condition of the IF_NEIGHBOR conditional statement whose body includes mip mapped texture fetch instructions wherein the neighboring pixel is one that is used to calculate a texture map; and
- if so, execute a compiled body of the IF_NEIGHBOR conditional statement for the current pixel including a mip map texture fetch instruction.

* * * * *

UNITED STATES PATENT AND TRADEMARK OFFICE
CERTIFICATE OF CORRECTION

PATENT NO. : 7,602,399 B2 Page 1 of 1
APPLICATION NO. : 11/375750
DATED : October 13, 2009
INVENTOR(S) : Andrew E. Gruber It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 766 days.

Signed and Sealed this

Fifth Day of October, 2010

David J. Kappos
*Director of the United States Patent and Trademark Office*